Oct. 8, 1946.  S. C. RIEKE  2,408,812
WAXING MACHINE
Filed Nov. 26, 1942  2 Sheets-Sheet 1

INVENTOR.
S. C. RIEKE
Lester B. Clarke
& Ray L. Smith
ATTORNEYS

Oct. 8, 1946.  S. C. RIEKE  2,408,812
WAXING MACHINE
Filed Nov. 26, 1942  2 Sheets-Sheet 2
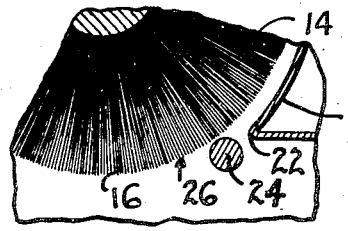
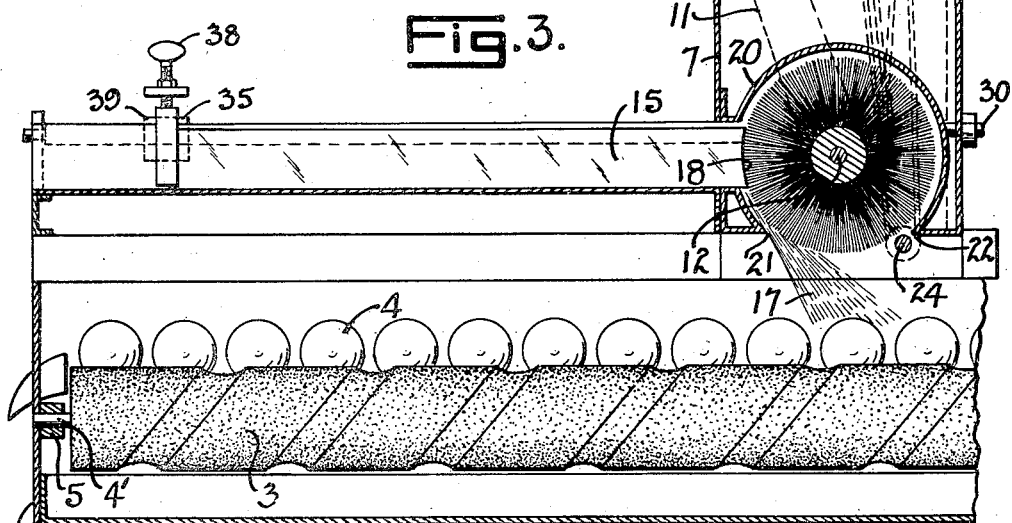
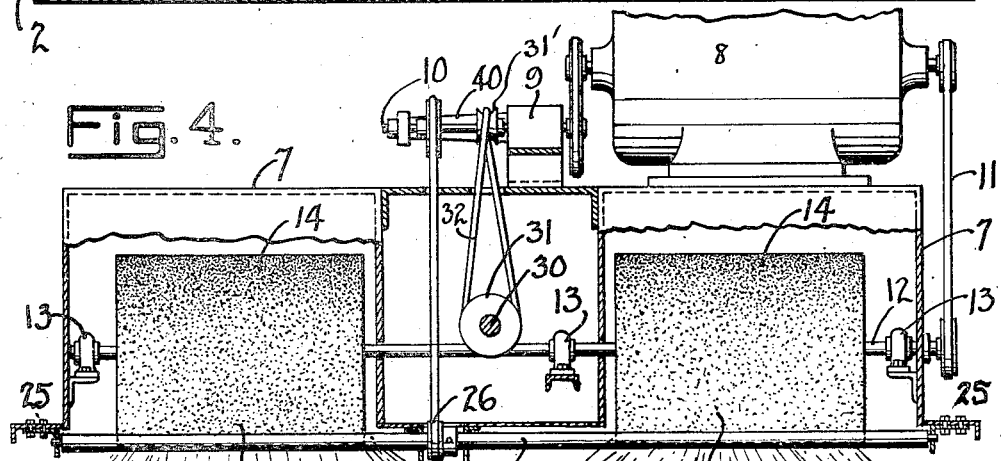
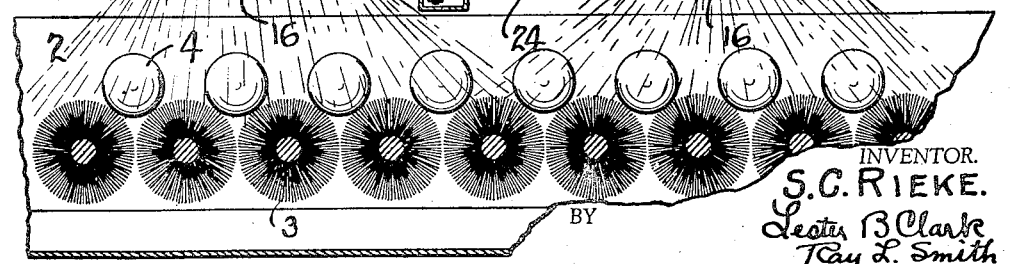
INVENTOR.
S. C. RIEKE.
BY Lester B Clark
Ray L. Smith
ATTORNEY Patented Oct. 8, 1946

2,408,812

UNITED STATES PATENT OFFICE 2,408,812

WAXING MACHINE

Sidney C. Rieke, Mission, Tex.

Application November 26, 1942, Serial No. 467,005

6 Claims. (Cl. 91—44)

The invention relates to a waxing machine of the type utilized in coating fruit, vegetables and the like.

It has been found that the coating of fruit and vegetables with a thin film of wax like material is of advantage in that it controls the moisture content of the article, avoids excessive evaporation and permits sufficient breathing to prevent decay.

It is imperative, however, that the coating material be evenly distributed and applied directly to the fruit or vegetable.

The present application is a continuation in part as to my prior co-pending application Serial No. 287,813, filed August 1, 1939, which has matured into Patent 2,372,225, dated March 27, 1945, for Fruit and vegetable waxer, which discloses and claims generally a machine for the direct application of a waxing material which is powdered and instantly applied to the articles.

The type of wax here used may be that of my prior copending application 441,231, filed April 30, 1942.

In the operation of the machine of the general type disclosed in my co-pending application, I have found that the wax like material, after being powdered, tends to bank up on a portion of the machine adjacent the high speed rotating brush and I have therefore devised an improvement for the machine which will feed this accumulation of powdered material back to the rotating brush so as to avoid clogging or imperfect operation of the machine.

It is an object of the present invention, therefore, to improve waxing machines for fruit and vegetables so as to apply a uniform coating of material.

Another object of the invention is to provide a feed back attachment for accumulations of wax in the coating machine.

Another object of the invention is to provide a positive feed construction for the wax in combination with a feed back for accumulations of wax on the machine.

Another object of the invention is to arrange a waxing machine so that there will be a uniform distribution of the material on the fruit by a direct pulverizing action so that the pulverized particles will adhere to the fruit and vegetables before evaporation of the volatile constituents thereof can occur.

Other and further objects of the present invention will be readily apparent when the following description is considered in connection with the accompanying drawings wherein Fig. 1 is a top plan view looking down on the machine.

Fig. 3 is a vertical sectional view taken on the line 3—3 of Fig. 1 and looking into the machine.

Fig. 4 is a vertical sectional view taken on the line 4—4 of Fig. 1 and looking into the brushes and the feed back attachment.

Fig. 5 is an enlarged detail view of the arrangement of the feed back shaft as it is disposed adjacent the brush and the supporting frame.

Figure 1:
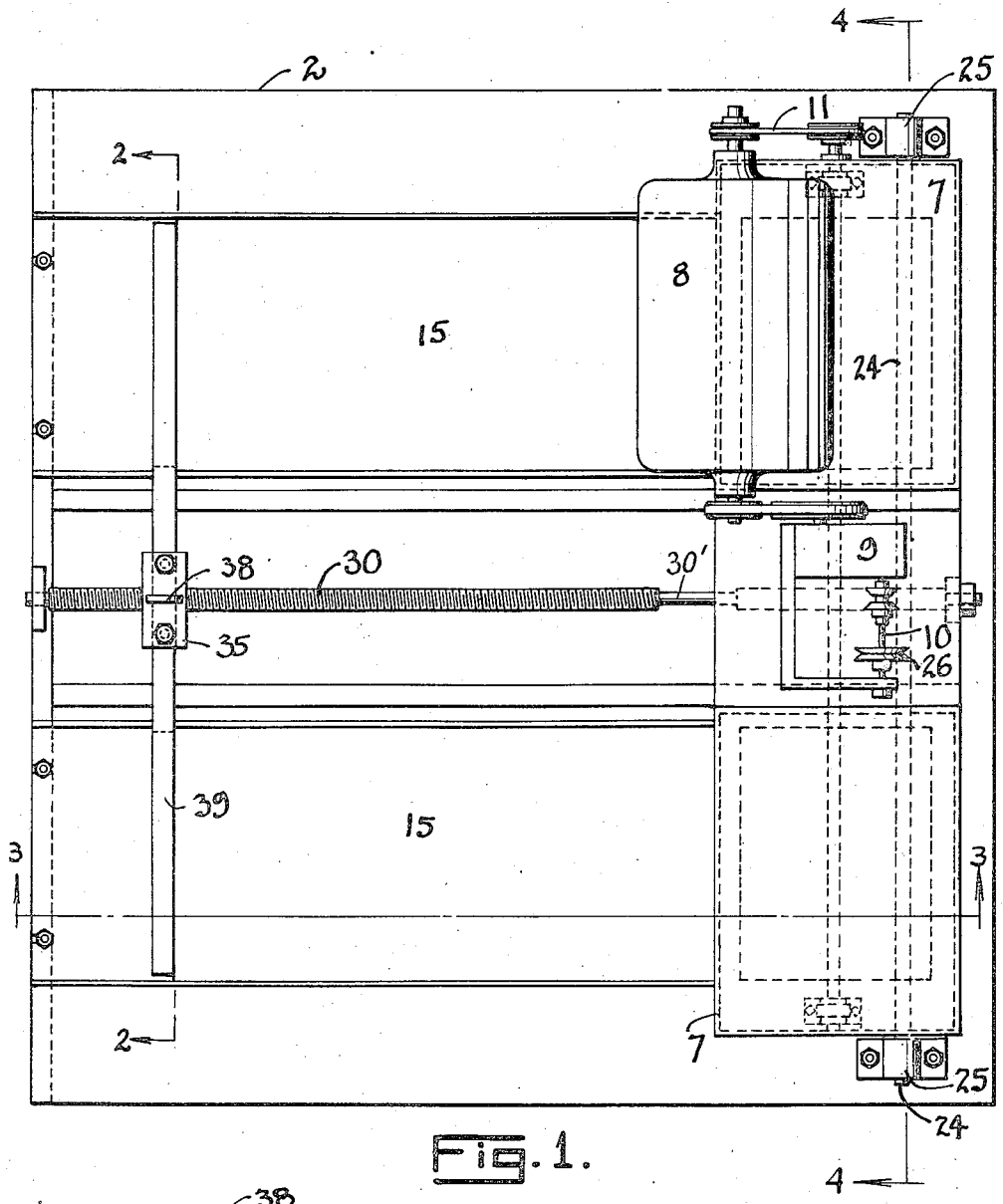

It is intended that the present application shall have the benefit of all common subject matter disclosed in my previous co-pending applications above referred to and that the present applications will claim the improvements herein disclosed in combination with the structure of the prior application.

The machine can be best seen in section in Fig. 3 and is made up of a frame structure 2 which is arranged to be positioned directly upon and adjacent the sorting or washing apparatus in a fruit or vegetable packing plant. It can, of course, otherwise be positioned, but it can be best utilized in this manner.

This frame 2 serves as a support for a series of suitably arranged supporting brushes 3 which are carried by shafts 4' mounted in bearings 5 on the frame. The arrangement of these brushes 3 is best seen in Fig. 4. It is to be understood that these brushes may be a part of the present machine or they may be a part of the packing house equipment. The brushes are rotated so as to agitate the fruit or vegetables which are illustrated by the articles 4 shown on the brushes.

Due to this rotation of the brushes which may have the bristles thereof arranged in spirals, the articles 4 are caused to travel along the brushes as seen in Fig. 3.

Mounted directly above the brushes on the frame 2 is a housing 7 which is shown in section in Fig. 3. This housing acts as a support for a motor 8, reduction gear machine 9 and the pulley shaft 10. There is a direct driving belt or chain 11 from the motor 8 to a shaft 12 which is mounted in the anti-friction bearing 13, inside of the housing 7. This shaft 12 carries one or more brushes 14, which may be in spaced relation as best seen in Fig. 4. It is intended that these brushes will rotate at a relatively high speed so as to contact the cake or other body of wax material 15. The wire tines 16 of the brushes are shown in Fig. 3 as brushing the fine particles 17 of wax material from the front face 18 of the cake of wax 15. It will be particularly noted that the brushes 14 are closely adjacent the articles 4 as they pass along the brushes. It is understood, of course, that the wax material is made up in semi-solid form with a suitable volatile material or solvent which evaporates quickly from the particles after the cake has been brushed. This is desirable so that the particles will adhere to the fruit and a suitable coating will in this manner be applied.

If they are too moist they may become gummy and not spread properly on the fruit. While, on the other hand, if the particles are permitted to evaporate before coming into contact with the fruit or vegetables, then they become hard and will not adhere or spread properly on the fruit. As a matter of fact, proper control is more or less a delicate operation so as to obtain a suitable coating.

In order to control this arrangement of the application of the particles to the fruit a protective jacket 20 has been disposed about the brushes 14 in the form of a curved or cylindrical member disposed inside of the housing 7. This jacket 20 has the open space at 21 through which the brush projects and from which the particles 17 are discharged as they are brushed from the cake of wax.

In view of the fact that the brushes 14 are rotating it was found that a considerable amount of the particles of waxing material thrown from the tines of the brushes banked on the corner 22 of this jacket. In this manner the waxing material particles would adhere to each other and gradually build up a body of wax on the corner 22 and frequently this accumulation would break loose and drop on to the fruit causing an improper and non-uniform coating of the fruit. With the view of eliminating this objectionable feature of accumulation of the wax thrown off by the brushes, the present invention contemplates the provision of a shaft 24, as seen in Fig. 3 in cross-section and in Fig. 4 in longitudinal elevation. This shaft is mounted on the bearings 25 at each end of the frame and passes through the housing 7. This shaft is caused to rotate by the belt and pulley assembly 26 driven from the shaft 10 at a reduced speed due to the provision of the gear box 9. This shaft 24 rotates slowly in a clockwise direction as viewed in Fig. 3 and is disposed in front of the corner 22 as best seen in the enlarged view in Fig. 5.

It will be noted that this shaft is spaced very closely to the ends 26 of the tines 16 so that as it turns in a clockwise direction any particles of wax which had been thrown off by the brushes which would have impinged against the corner 22 are caused to strike the shaft 24 and as the shaft 24 rotates this accumulation will be gradually fed into the surface of the rotating brush 14 and carried around by the brushes to be thrown off onto the fruit. This shaft 24 is of such a diameter that it interferes with the line of flight of any particles thrown off by the tines of the brush, which would impinge against or adhere to the jacket 20 or housing 7. Of course, any accumulation of particles inside the jacket 20 would be wiped off by the rotation of the brush. In this manner the particles which would otherwise accumulate on the corner 22 are fed back to the brush without being permitted to evaporate for too great a period because of the steady rotation of this shaft 24.

With the foregoing structure it has been found in actual practice that the machine can run for many hours at a time without causing clogging of the waxing material or accumulations of the pulverized wax.

Figure 2:
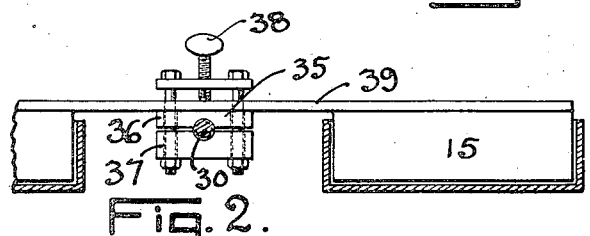
Fig. 2 is a section taken on the line 2—2 of Fig. 1 and looking in the direction of the arrows.

In order to feed the wax cake 15 against the brushes at a predetermined and positive rate of speed a drive shaft 30 has been arranged in the machine and is best seen in plan view in Fig. 1, and in cross-section in Fig. 4. This shaft 30 has a pulley 31 thereon driven by a belt 32 from the shaft 10 by means of the pulley 31' which is driven at a reduced speed. The pulleys 31 and 31' are made up of two parts threaded at the center hub portion so that by adjustment the size of the pulley and thus the speed of the belt varied. A clamp 35 made up of the upper plate 36 and the lower block 37 was arranged to be clamped about the shaft 30 by a set screw 38 as best seen in Fig. 2. The top plate 36 has a smooth half circular groove to fit over the shaft while the block 37 has a threaded groove so that as the screw 38 is tightened these threads engage the threaded shaft. This block carries a cross bar 39 which abuts against the rear end of the blocks of wax 15. As the machine operates the shaft 30 is rotated at a predetermined speed depending upon the adjustable connection at 40 on the shaft 10. The arrangement of the blocks 36 and 37 permit connection of the device to the shaft 30 at any desired position depending upon the length of the block or cake of wax. The cut away portion at 30' allows the blocks to stop when the cake has been exhausted.

The machine is very simple and economical in its construction and operation, and, as noted above, can run for many hours without attention due to the automatic feeding of the wax, the feed back for the accumulation of the pulverized particles, and the uniform movement of the various parts.

Broadly the invention contemplates a waxing machine which will not become clogged and which will uniformly feed the waxing material to the articles being waxed.

What is claimed is:

1. A fruit and vegetable waxer including a frame for positioning upon a conveyor receiving articles to be waxed, means to conduct the articles through said frame, a wax cake support portion, means to move the wax at a predetermined speed, a rotating brush to brush the end of the wax cake to powder the wax, said brush being disposed directly over said first means, and additional means to receive and feed back to the brush powdered wax thrown from the brush beyond the angle of contact with the articles.

2. A fruit and vegetable waxer including a frame for positioning over the articles to be waxed, means to conduct the articles through said frame, a wax cake support portion, means to move the wax at a predetermined speed, a rotating brush to brush the end of the wax cake to powder the wax, said brush being disposed directly over said first means, additional means to receive and feed back to the brush powdered wax thrown from the brush beyond the angle of contact with the articles, and still additional means to drive said feed means, said brush, and said feed back means.

3. In a waxing machine of the character described having a rotatable brush to powder cake wax, a housing about said brush, an entry thereto to feed the wax to the brush, an opening therein to discharge powdered wax, and means at the rear of said opening to feed back to the brush powdered wax thrown off by the brush above the angle of the articles being waxed.

4. In a fruit and vegetable waxing machine, a frame, means to conduct the articles to be waxed under the machine, a wax feeder mechanism including means for supporting a cake of wax, a rotary brush to brush the wax from the cake in particle form, means to receive the particles of wax which would otherwise strike and accumulate on said frame, and means operable to feed the powdered wax thus thrown on to said last means back to said rotary brush.

5. In a fruit and vegetable waxing machine a frame, means to conduct the articles to be waxed under the machine, a support for a cake of wax including means to feed the cake along said support, a rotary brush to brush the wax from the cake in powder form, rotatable means to receive the wax thrown off by said brush at an angle which would strike said frame, and additional means to rotate said last means to return such wax to the rotating brush.

6. In a fruit and vegetable waxing machine a frame, means to conduct the articles to be waxed under the machine, a support for a cake of wax including means to feed the cake along said support, a rotary brush to brush the wax from the cake in powdered form, a device to feed back powdered wax to the rotary wax cutting brush comprising, a roller mounted on said frame, said roller having a periphery disposed to just clear said rotating brush, means to slowly turn said roller so that the powdered tacky wax thrown off by said brush which would otherwise lodge upon said frame will be intercepted by said roller and fed back to the brush.

SIDNEY C. RIEKE.